J. G. MARTIEN.
MANUFACTURE OF IRON AND STEEL.
No. 16,690.  Patented Feb. 24, 1857.
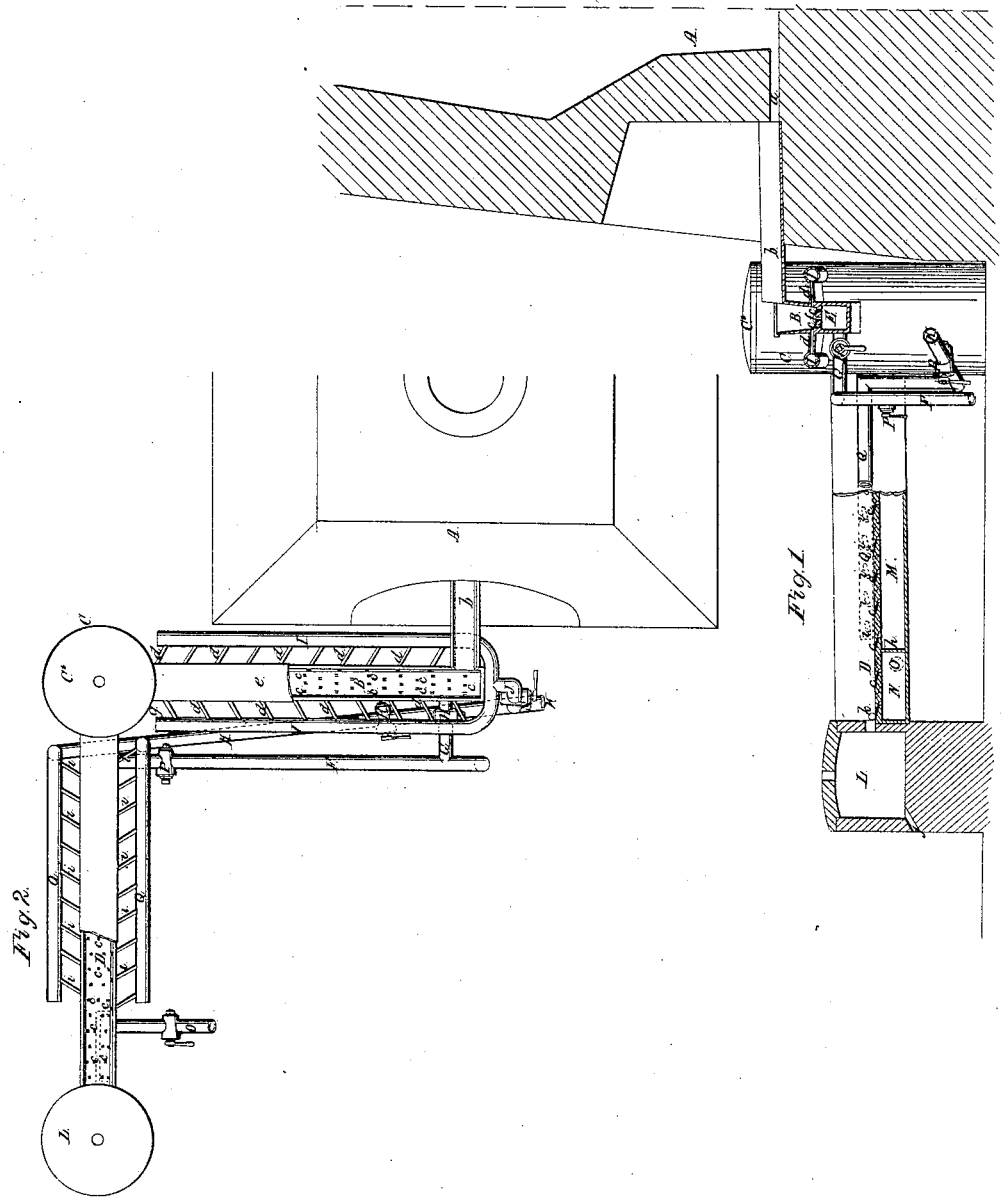

UNITED STATES PATENT OFFICE.

J. G. MARTIEN, OF NEWARK, NEW JERSEY.

IMPROVEMENT IN THE MANUFACTURE OF IRON AND STEEL.

Specification forming part of Letters Patent No. 16,690, dated February 24, 1857.

*To all whom it may concern:*

Be it known that I, JOSEPH GILBERT MARTIEN, of Newark, in the county of Essex and State of New Jersey, have invented a new and useful Improvement in the Manufacture of Iron and Steel; and I do hereby declare that the following is a full, clear, and exact description of the same, reference being had to the accompanying drawings, forming part of this specification.

My invention relates to the purifying or conversion of iron, while in a fluid or molten state, by causing a current or currents of atmospheric air, steam, or gas, of suitable character to pass through, among, or in contact with it, such mode of purification or conversion being employed for the production of a refined cast-iron, steel, or malleable iron; and my said invention consists in bringing a current or currents of atmospheric air, or steam, or other gas which will give out or evolve oxygen, in contact with the molten iron in such manner as to beneficially affect or search through the same while it is in the act of flowing or transit through a trough or conductor, or along or over or through or from any vessel or place; and my invention also consists in applying to iron in the molten state, and while it is in the act of flowing or transit, any of the solid agents—such as manganese—which have a beneficial effect in purifying or improving the quality of iron. The treatment of the metal in a flowing condition possesses the advantages of distributing the air, steam, or other gases employed, or solid purifying or converting substances, more thoroughly and searchingly among all the particles of the metal, of facilitating the throwing off or escape of the impurities, and of affording facilities for manipulation during the purifying or converting process.

In carrying my invention into practice, I prefer to use one or more troughs with slightly-inclined bottoms, along which the fluid metal will be caused to flow by gravitation, said troughs being provided with covers which are capable of being removed wholly or in part, or with apertures in the sides above the surface of the metal, for the purpose of working the metal about with a suitable tool, or otherwise manipulating it during the purifying or converting process, and either being provided with perforated bottoms to enable air, steam, or gases to be forced upward through the metal from a chamber or pipe underlying the said bottom, or else having their sides penetrated by numerous small pipes or tuyeres branching from larger pipes, which supply air, steam, or other gas, in suitable quantities, either above or below the surface of the fluid metal, though in some cases I would construct the troughs to combine both of the features above-named—that is to say, with perforated bottoms, and tuyeres through the sides. The construction of the apparatus employed, or manner of applying atmospheric air, steam, or other gas, so as to cause a complete contact with and searching distribution through and among the particles of iron, may, however, be varied according to convenience or to suit the character of the ore or material from which the metal has been smelted, and according to the peculiar properties it is desired the metal should possess after treatment; but in order to enable others skilled in the art to work my invention, I have represented in the accompanying drawings the mode of applying and the form of apparatus I prefer, and which I will now proceed to explain.

Figure 1 is an elevation, partly in section, showing the apparatus applied in connection with a smelting-furnace; and Fig. 2 is a plan of the same.

Similar letters of reference indicate corresponding parts in both figures.

A represents a portion of a smelting or other melting furnace of which a, Fig. 1, is the tap-hole, from whence a small gutter, b, leads to a trough, B, which I will term a "purifying or converting trough," which trough leads into an upright cylindrical chamber or crucible, C, which has a movable cover, C*, having a slight downward inclination from the gutter b to the said chamber or crucible, so that the fluid metal from the furnace may flow along it by gravitation.

The purifying and converting trough B and gutter b may be of cast-iron, their interior surfaces being lined with fire-brick or a coating of fire-clay, or other good refractory material, to protect them from the heat of the fluid metal that is allowed to flow through them.

E is a chamber under the bottom of the trough B, extending the whole length thereof, for the purpose of supplying air, steam, or other purifying or converting gas through numerous perforations, c c, of a tuyere-like character in the bottom of the trough, to penetrate and search through the fluid metal as it flows through the trough from the furnace toward the chamber or crucible C. This chamber E may be cast with the trough in sections of convenient length. The perforations c c should be preferably inclined in the direction of the flow of the metal in a similar manner to the openings shown in the bottom of a similar trough, D, which is shown partly in section in Fig. 1, in order to give the streams of air, steam, or gas admitted through them an oblique direction through the metal, and thus cause them to pass in contact with a greater surface of the metal, and also to assist the flow of the metal. The perforations may, however, pass directly through the bottom of the trough without inclination, or be inclined in the opposite direction to that above specified. F is a pipe for supplying cold or heated air, steam, or other purifying or converting gas from a blast apparatus or generator to the chamber E at a suitable pressure to force its way through the stratum of fluid metal flowing over the bottom of the trough B, said pipe connecting with the said chamber by a branch, G, which is fitted with a stop-cock, H.

I I are two pipes stationed at or near the sides of the trough B, to supply air, steam, or gas to two series of tuyeres, d d, which enter the trough on each side, said pipes branching off from a pipe, J, which is itself a branch of a pipe, K, coming from a blast apparatus or generator. The trough B is fitted with a cover, e, which may be made in sections which are capable of being taken off one at a time to uncover any portion of the trough for the purpose of manipulating or working the metal with a suitable tool during the purifying and converting process, or to enable the process to be observed, and for the escape of the gases eliminated by the process.

The chamber or crucible C may be of heavy cast-iron and be kept coated with fire-clay; but generally I prefer the exterior to be a mere shell of iron and lined with a thick lining of heavy fire-brick or other refractory material. It should be of such diameter as to contain the whole of a charge from the furnace A without its rising above the inlet from the trough B, which inlet f, Fig. 1, stands at a height of about thirty-six inches above the bottom of the said chamber or crucible; and its whole depth may be about five feet. There is a tap-hole at g, Fig. 2, in one side of the purifying-trough B, near the chamber or crucible C, at which to allow the metal to escape from the trough without its passing into the chamber or crucible. Close to the bottom of the chamber or crucible there is a tap-hole through which to permit the escape of the fluid metal therefrom into a second purifying and converting trough, D, which has been before mentioned, the said trough D being exactly like B in all respects, and having a slight downward inclination toward and communicating with a second chamber or crucible, L, which is shown in Fig. 2 in section, resembling the first one, C. The trough D has a chamber, M, below it like the chamber F below the trough D; but near the lower end there is a partition, h, in this chamber, which makes a separate chamber, N. This chamber N communicates with the trough through perforations c c in the bottom thereof in a similar manner to the chamber M, and is for the purpose of supplying to the fluid metal a different gas to that admitted higher up the trough, for a purpose to be presently explained. The chamber N is supplied with gas at a suitable pressure from a proper reservoir or generator by a pipe, O. The chamber M is supplied with air, steam, or gas by the same pipe, F, as the chamber E under the first trough, B, the supply being admitted or cut off at the pleasure of the operator by a stop-cock, P. The trough D has two pipes, Q Q, arranged near its sides, like the pipes I I belonging to the trough B, the said pipes Q Q being supplied with air, steam, or gas from the pipe K, before mentioned, for the purpose of supplying a number of tuyeres, i i, entering the sides of the trough in the same manner as those d d, enter the trough B. The pipe K is furnished with a stop-cock, R, to shut off the supply from the pipes Q Q.

It will be understood by reference to the several pipes and cocks that either chamber E or M can be supplied with air, steam, or gas while the supply is cut off from the other, and the same may be said of the side pipes, I I, and those Q Q. The chamber or crucible L is provided with a tap-hole, j, at or near the bottom, and the trough D is also provided with a tap-hole, k, at which the metal may be drawn off without being allowed to enter L.

The purifying or converting process is conducted in the following manner: Before opening the tap-hole a of the furnace, to allow the charge to flow through the trough B, the cock H must be opened to fill the chamber E with air, steam, or gas, which will issue through the perforations c c in the bottom of the trough and prevent their being filled by the fluid metal. When the fluid metal is allowed to run into the trough, it flows down the inclined bottom thereof, either to escape by the tap-hole at g into a pig-bed or into molds of any form or into water, to be granulated, or else run through f into the chamber or crucible C. Care must be taken so to regulate the flow of the metal from the furnace that the greatest depth of the stratum of metal in the trough shall be such that the pressure due to it is considerably less than that of the air, steam, or gas issuing through the perforations c c. It will be found convenient to operate on a stratum of metal of a depth of from four to six inches, with a pressure of air, steam, or gas about three pounds per square inch. I propose, for the most part, to inject through the fluid iron from the chamber E heated air, as supplied by the ordinary blast apparatus of the furnace; but steam may also be used, although I prefer the steam, when applied, to be superheated, the object being to supply oxygen, to combine with and produce combustion of the carbon contained in the metal, and at the same time to oxidize the silicon, sulphur, and other impurities, which will thus be caused to rise to the surface of the metal in the form of slag or escape in the gaseous form. The distribution of the air or steam, so as to penetrate among and between all the particles of the metal, is very greatly assisted by its rolling action and motion in contact with the currents of air, steam, or other gas while in a flowing state or state of transit. Air or steam may be also introduced through the side tuyeres, $d$ $d$, by opening the cock S in the pipe J at the same time as it is introduced through the bottom of the trough, the said tuyeres being arranged either to inject the streams of steam or air below or down upon the surface of the metal; or air may be injected through the perforated bottom and steam through the sides, or vice versa. When cast-iron is required, the purification or conversion will seldom require to be carried on beyond the trough B, and the metal may be allowed to run off, through the tap-hole at $g$, to suitable molds or any suitable receptacle. The scum or cinder which is evolved and thrown to the surface of the metal by the purifying or converting process may be skimmed off the metal, while in the crucible, on the removal of the cover; but I prefer to allow it to act as a covering to the metal while in the crucible, and to allow it to flow down after the metal when the latter is tapped off. During the process of purification by air or steam or other oxidizing-gas, while the metal is flowing through the trough B, when cast-iron is required, the following mixture may be used with advantage as an auxiliary to the air or steam, viz: six parts, by weight, of lime or hydrate of lime, one part of chloride of sodium. Of the above mixture I introduce, in any convenient manner, into the trough, near the top of the furnace, about one-third per cent. of the weight of the quantity of iron to be operated upon. I prefer to introduce this by means of a tube in such manner that it may be caught in the flow of the metal, and the tumbling and agitation of the flowing mass will cause a complete intermingling of all the particles. When it is desired to purify the fluid metal of a proper portion of its carbon to give it the malleable welding and hardening properties of steel, it is allowed to flow from the first purifying-trough, B, to the crucible or chamber C, and from thence at once or without other treatment allowed to flow through the second purifying and converting trough, D, where it is further subjected, as in the first trough, B, to the action of air, steam, or other gases containing or capable of evolving oxygen, though in an apparatus constructed expressly for this purpose I would have a single trough of about sixty feet in length, instead of the two troughs of thirty feet. In the manufacture of steel by this process there may be injected into the fluid metal, near the lower end of the second trough, or at any such point or place therein as may be desirable, or of the long single trough just described, hydrogen or carbureted hydrogen. It is for this purpose that the chamber N is set off. The metal, when purified or converted to the condition above described, may be run out at the tap-hole $k$ at the bottom of the trough D into molds, as is usual in pouring cast-steel from pots, to be afterward treated by hammering, rolling, or other means, or into molds of proper shape for articles of utility—as, for instance, agricultural or other implements. I however prefer to run it first into the chamber or crucible L. When it is desired to bring the metal to the condition of malleable or wrought iron, the process of purification or conversion by air, steam, or gases, as above described, may be further prolonged than when treating for steel, by increasing the lengths of the purifying and converting troughs, or by adding a third trough and receiving chamber or crucible. No positive rules can be laid down for the length of the troughs and time required to complete the process of purification or conversion, as much will depend on the character of the metal under treatment.

Whatever substances it may be desired to mix with the molten iron may be applied as above indicated; but such substances should be pulverized or dissolved before applying them, the better to insure the thorough admixture as the metal flows.

I do not here intend to claim, generally, either the purification of fluid or molten iron by forcing through, among, or in conntact with it air, steam, or other oxidizing or purifying gases, or the employment of any chemical agents for the same purpose; nor do I wish to limit myself to any particular construction or arrangement of apparatus for the purifying or converting process, or to the use of such chemical agents as have been herein specified; but

What I claim as my invention, and desire to secure by Letters Patent, in the purification or conversion of fluid or molten iron, is—

Subjecting the molten iron to the action of atmospheric air, steam, or other gaseous body or chemical agents in any form capable of evolving oxygen or other purifying gas in such manner as to cause the air, steam, or other solid liquid or gaseous body to impinge upon, penetrate through, or search among the metal while it is flowing or in a state of transit through a trough or conductor or other place, substantially as and for the purpose specified.

J. G. MARTIEN.

Witnesses:
HENRY T. BROWN,
J. F. BUCKLEY.